April 25, 1939.  H. THOMA  2,155,455
HYDRAULIC MOTOR AND PUMP
Filed April 20, 1935   7 Sheets-Sheet 2

INVENTOR
HANS THOMA

BY A. A. Liche
ATTORNEY

April 25, 1939.   H. THOMA   2,155,455
HYDRAULIC MOTOR AND PUMP
Filed April 20, 1935   7 Sheets-Sheet 3

INVENTOR
HANS THOMA
BY
ATTORNEY

April 25, 1939. H. THOMA 2,155,455
HYDRAULIC MOTOR AND PUMP
Filed April 20, 1935 7 Sheets-Sheet 4
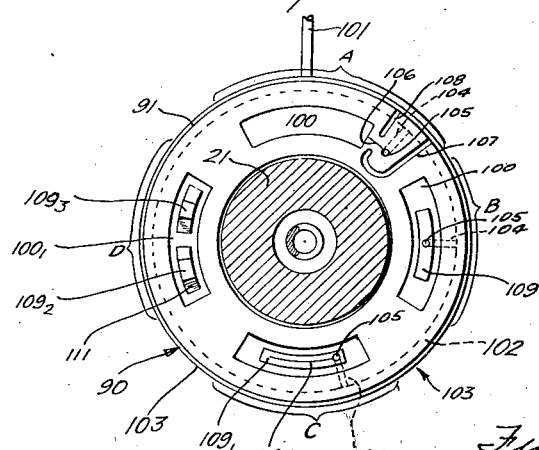
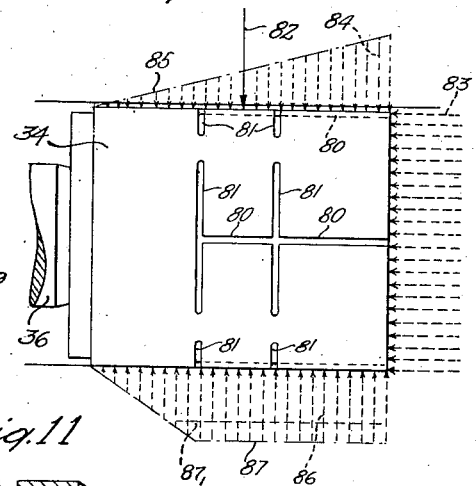
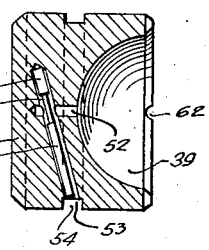
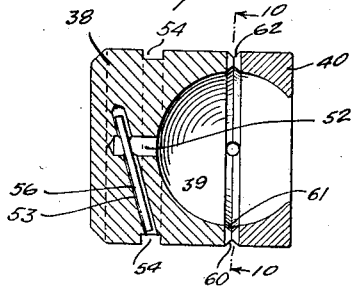
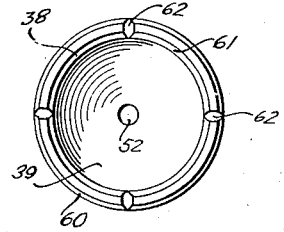
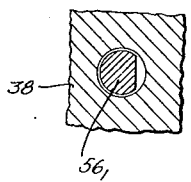
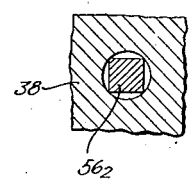
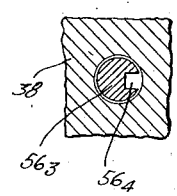
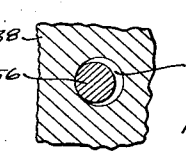
INVENTOR
HANS THOMA
BY
ATTORNEY April 25, 1939.   H. THOMA   2,155,455
HYDRAULIC MOTOR AND PUMP
Filed April 20, 1935   7 Sheets-Sheet 5

INVENTOR
HANS THOMA
BY
ATTORNEYS

April 25, 1939.  H. THOMA  2,155,455
HYDRAULIC MOTOR AND PUMP
Filed April 20, 1935   7 Sheets-Sheet 6
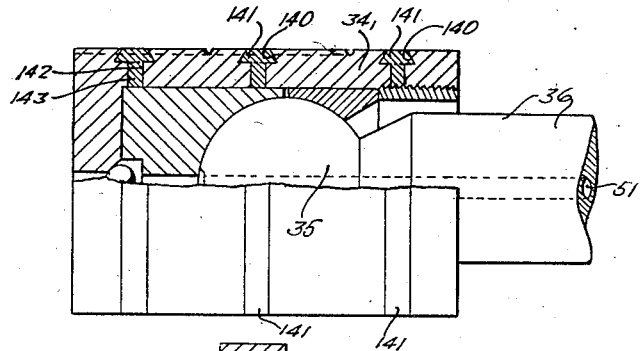
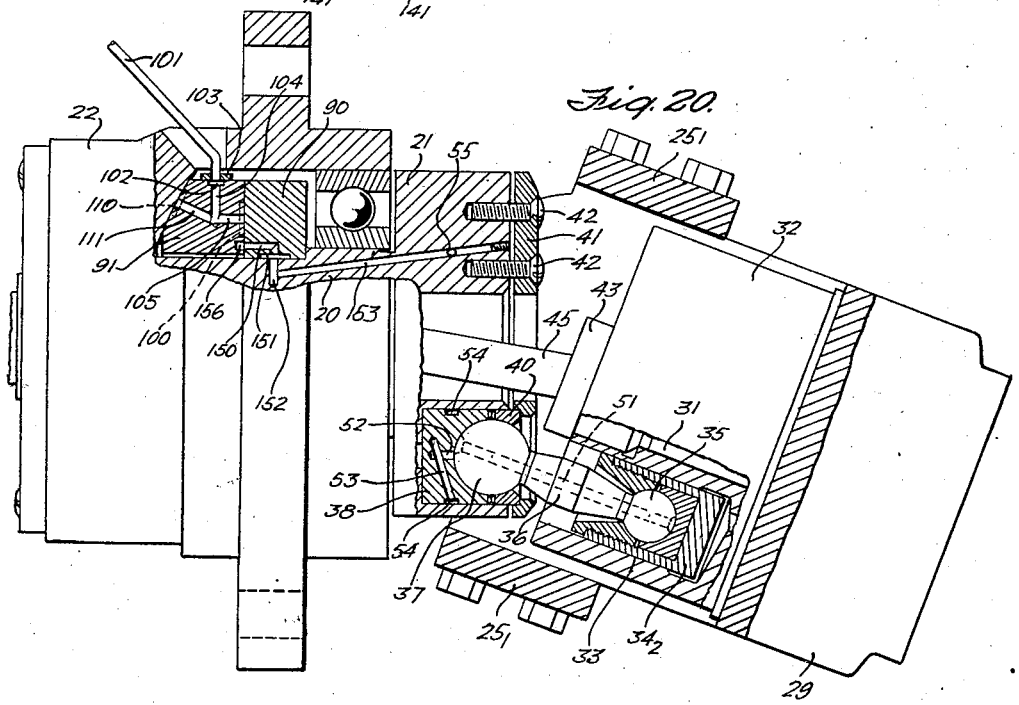
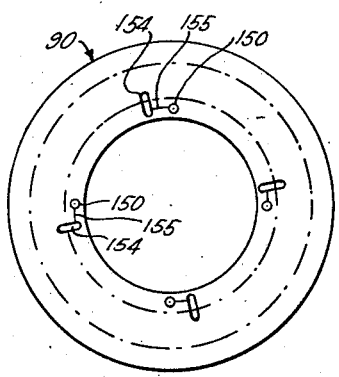
INVENTOR
HANS THOMA
BY
ATTORNEY April 25, 1939.  H. THOMA  2,155,455
HYDRAULIC MOTOR AND PUMP
Filed April 20, 1935  7 Sheets—Sheet 7
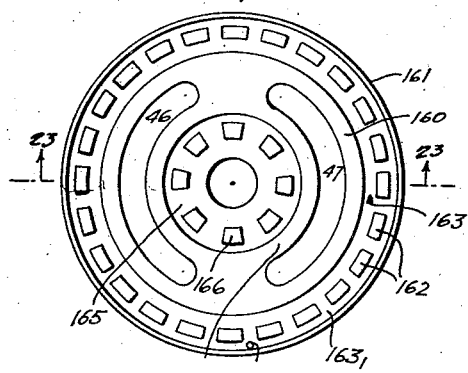
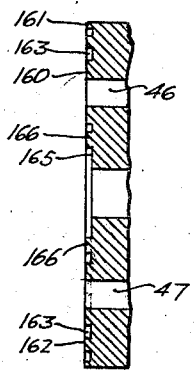
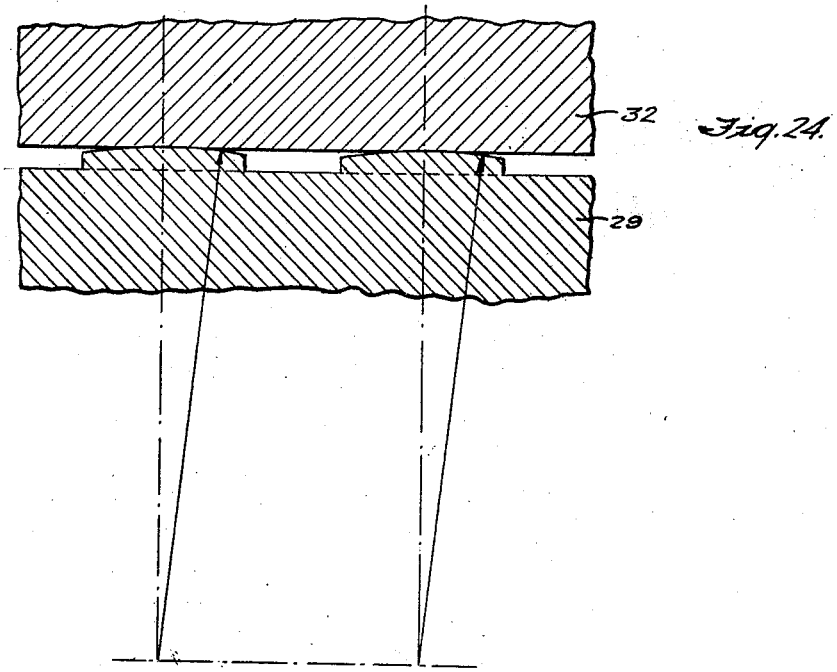
INVENTOR
HANS THOMA
BY
ATTORNEY Patented Apr. 25, 1939

2,155,455

UNITED STATES PATENT OFFICE 2,155,455

HYDRAULIC MOTOR AND PUMP

Hans Thoma, Karlsruhe, Germany

Application April 20, 1935, Serial No. 17,409
In Germany November 24, 1932

19 Claims. (Cl. 103—162)

This invention relates to improvements in hydraulic motors and pumps and has particular application to such devices of the longitudinal cylinder type such as shown in U. S. patent to Janney 1,020,285, or of the oscillatable cylinder type such as shown in applicant's U. S. Patent 1,931,969, although certain features of the present invention are applicable in machinery generally.

Among the objects of the present invention is to improve the construction of the co-acting surfaces of the cylinder block and stator; to provide an improved thrust bearing; to provide means for lubricating the connecting rod bearings by the application of oil under pressure at a time when the bearings are not under load; to automatically control the pressure of said lubricating oil; to improve the pistons of such and other devices by causing the pressure of the fluid utilized therein to automatically balance the pistons against the action of centrifugal and other forces; and to generally improve such hydraulic devices.

Other objects will become apparent from the following description taken in connection with the attached drawings showing several illustrative embodiments of the invention and wherein:

Fig. 1A shows a detail of a modification of the form shown in Fig. 1;

Fig. 7 is a view taken on the line 7—7 of Fig. 1 and shows the thrust bearing construction, the four sectors, A, B, C, and D thereof showing four modified forms;

Fig. 8 shows a piston provided with means for automatically balancing it against side pressure;

Fig. 9 shows in cross-section one of the socket cups for the ball and socket connecting rod joint together with its retaining ring;

Fig. 10 shows the cup as viewed on the line 10—10 of Fig. 9;

Fig. 11 shows one of these cups with a modified form of throttling pin therein;

Figs. 12, 13, 14 and 15 show throttling pins of various cross-sections;

Fig. 19 represents a modified form of piston construction.

Fig. 20 is a view similar to Fig. 1 but showing a modified form of lubricating device in which fluid is used to lubricate the fluid supported thrust bearing and then to lubricate the piston rod bearings.

Fig. 21 is a view looking left to right of the rotating thrust bearing element of Fig. 20.

Fig. 22 shows in elevation a modified form of valve thrust plate.

Fig. 23 shows a cross-section thereof on line 23—23 of Fig. 22.

Fig. 24 shows a further modification of valve thrust plate.

Figure 1:
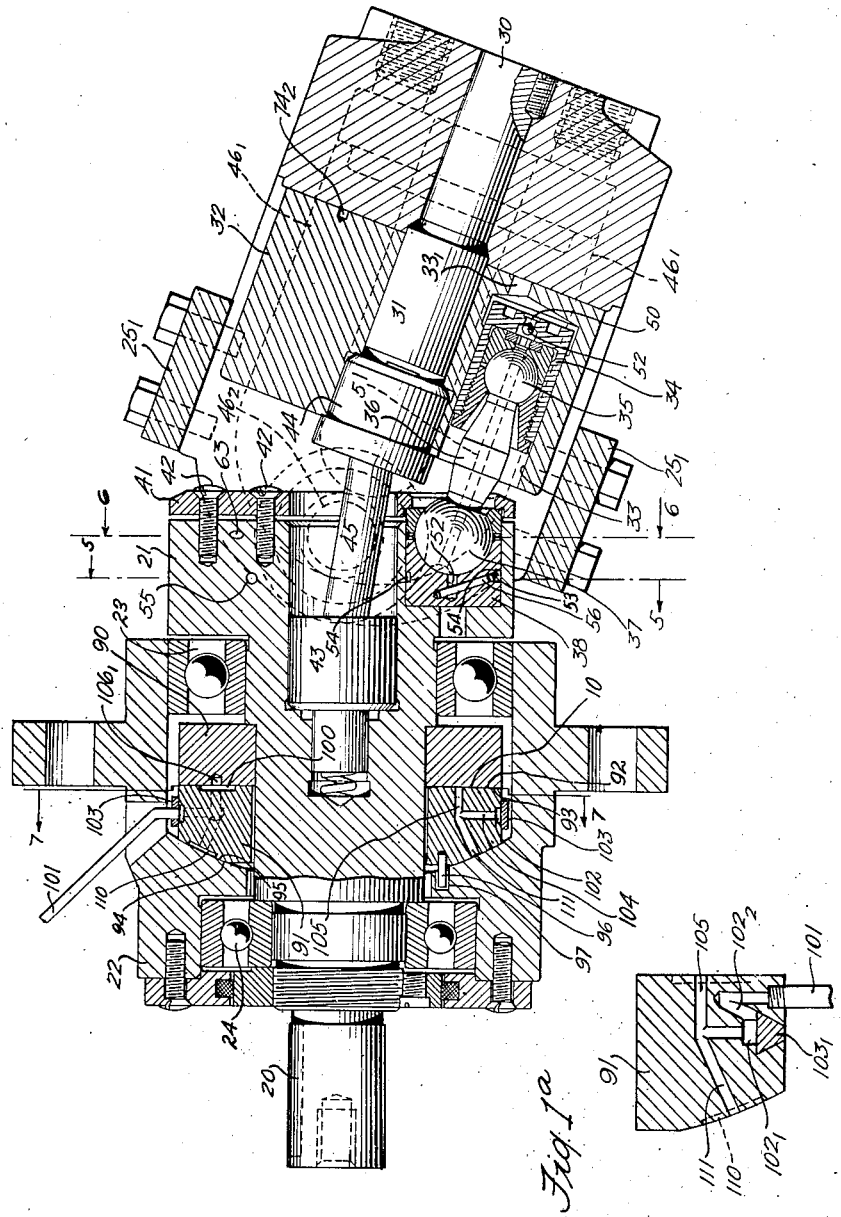
Fig. 1 is a partial longitudinal section of one form of embodiment.

Referring to said drawings, the numeral 20 designates generally the driving member in the form of a shaft formed with a driving flange 21 and mounted for rotation in a body member 22 by means of radial ball bearings 23 and 24 and supported against endwise thrust by means of a special thrust bearing which will be described in greater detail later. The body member 22 is provided with a pair of extensions or arms 25 which may be bolted thereto as shown, or may be formed integral therewith if desired. These arms may be provided with integral or bolted on transverse strengthening connections as 25₁ and are formed with openings 26 to receive the journal portions 27 carried by the arm portions 28 of a cylinder block support 29, which is preferably of generally U-shaped or yoke form. This support is shown as provided with a bearing pin having a reduced portion 30 fixed in the cylinder block support 29 (which will also be referred to as the stator member) and having a bearing portion 31 received in a central opening in the cylinder block 32 which is provided with a plurality of cylinder bores 33, five in the form illustrated. Each of said cylinder bores contains a piston 34 which is so constructed as to form a suitable socket for the ball end 35 of a connecting rod 36, the other end of which is formed with a ball end 37 received in sockets in the driving flange 21. These sockets are preferably of special construction and may consist of cup members 38 formed with a hemispherical seat 39 to receive one of the balls 37. Each ball is held in place by a ring 40, all of which are held in place by means of a ring 41 secured to the driving flange in any convenient manner as by screws 42. Any suitable means is provided for rotating the cylinder block 32 in unison with the shaft 20 which may consist of universal joint members 43 and 44 connected respectively with the shaft 20 and cylinder block 32 and connected to each other by means of a connecting shaft 45.

Figure 2:
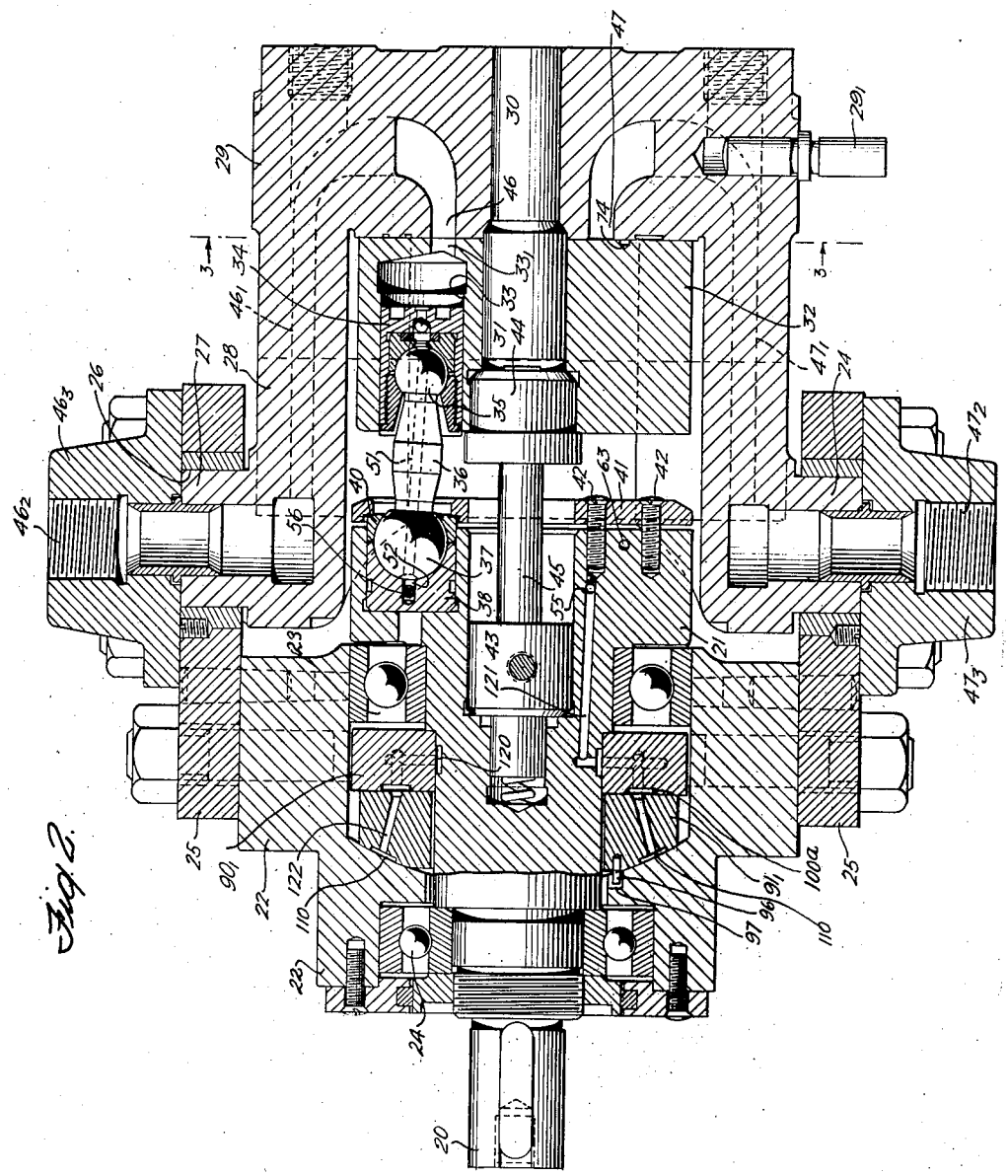
Fig. 2 is a partial longitudinal cross-section taken on a plane at right angles to the section shown in Fig. 1, and showing a modified form of thrust bearing.
Figure 3:
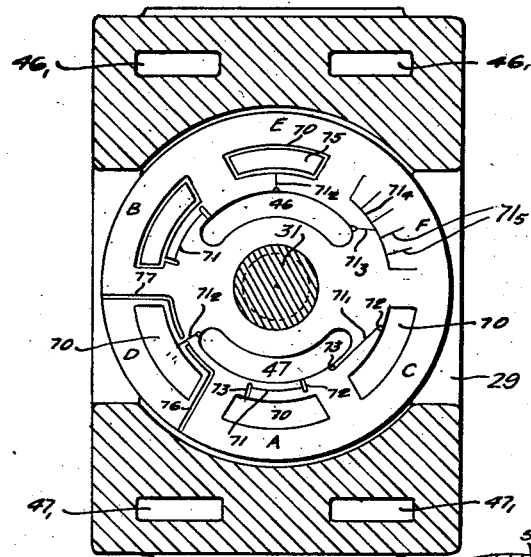
Fig. 3 is a cross-section taken on the line 3—3 of Fig. 2, looking in the direction of the arrows, the six sectors, A, B, C, D, E, and F, showing various modified forms.
Figure 5:
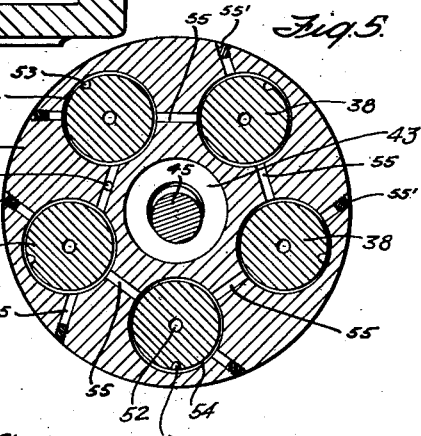
Fig. 5 is a cross-sectional view taken on the line 5—5 of Fig. 1 and showing part of the passages for conveying lubricating fluid from one cylinder to another.
Figure 4:
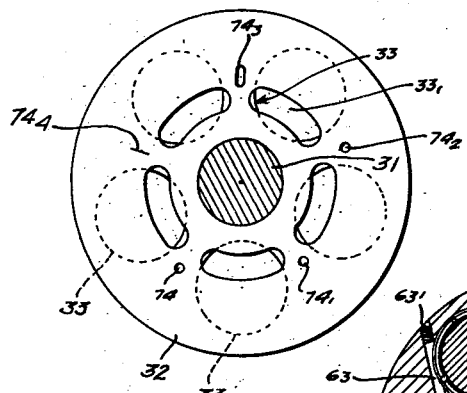
Fig. 4 is an end view of the cylinder block as seen on the line 3—3 of Fig. 2 looking in a direction opposite to that indicated by the arrows.

The cylinder blocks 33 are provided with a cylinder port 33₁ of any suitable form, but preferably of the form shown in Fig. 4, which ports cooperate with the segmental intake and delivery ports 46 and 47 in the stator member 29. As shown in Figs. 2 and 3, there are delivery passages 46₁ and 47₁ formed in the arms 28 and leading out through the journals 27 and communicating with the exterior through suitable pipes which may be received in threads 46₂ and 47₂ in the members 46₃ and 47₃ respectively.

From the above description it will be readily understood that if the shaft 20 is rotated that the cylinder block 32 will be rotated in unison therewith through the universal joint connecting means described and that the pistons 34 will be caused to reciprocate within their cylinder bores, the extent of reciprocation depending upon the angle of oscillation of the cylinder block support yoke 29 relative to the shaft 20, the position of the yoke 29 being determined by suitable manual or other control mechanism attached for example to the pin 29₁. If the support 29 is in the central position there will be no movement of the pistons in their cylinder bores and if oscillated to either extreme position the piston displacement will be a maximum. It will also be understood that as the pistons are being moved outwardly (i. e., to the left in Figs. 1 and 2), their corresponding cylinder ports 33₁ will be in communication with one of the segmental ports 46 or 47, whereas while they are moving inwardly their cylinder ports are in communication with the other segmental port 46 or 47 so that one of said ports becomes an intake port and the other the discharge port, depending upon the direction of rotation and the side to which the cylinder block support or yoke is oscillated. It will also be understood that if the member 46₃ or 47₃, which corresponds to the intake side of the pump, is in communication with a supply of fluid such as oil, that the fluid will be drawn into the cylinders during registry with one of the ports 46 or 47 and subsequently discharged through the other port 46 or 47 and thence through passage 46₁ or 47₁ and delivered into any suitable receptacle.

The means for lubricating the connecting rod ball joints will now be described. It will be noted that each of the pistons is formed with an opening 50 through its face, permitting oil under pressure to be delivered from the piston into the axial bore 51 in each piston rod. Each piston is also preferably supplied with a check valve which may be in the form of a ball 52 cooperating with a seat in the piston in such a way as to admit oil from the cylinder into the connecting rod by preventing the delivery of oil from the connecting rod into the cylinder for a purpose to be described later. It is not new to lubricate the connecting rod balls of such pumps by means of oil delivered from the cylinders through an opening in the piston and in the connecting rod, but in all such devices known to the applicant the lubricating fluid utilized for lubricating the joints of a particular connecting rod was received from the corresponding cylinder. Such constructions are almost entirely ineffective because since the projected area of the connecting rod ball within the piston is necessarily smaller than the area of the piston itself and since the pressure upon the fluid is proportional to compressive stresses in the connecting rod, the unit pressure of the fluid must necessarily be smaller than the unit pressure as between the connecting rod ball and its seat within the piston. Any lubrication which occurs with a construction of that type is therefore mainly due to a capillary action of the oil causing it to enter between the spherical surfaces. As this effect is very limited, such devices can operate only under low pressures and at low speeds.

The present invention includes an arrangement whereby oil from a cylinder which at the moment is under pressure may be caused to lubricate the connecting rod joints of one or more other cylinders which at that moment are under a lower or even a minus pressure. This is accomplished by providing an annular passage, preferably within the driving flange, to which passage is connected the axial bore 51 in each connecting rod. This means is shown in greater detail in Figs. 5 and 9–15 inclusive.

Each of the cups 38 is provided with a hemispherical seat 39 and a preferably center bore 52 with which communicates a generally radial bore 53 which, in turn, communicates with an annular groove 54 on the outer surface of the cup member 38. As will be seen in Fig. 5, the operating flange is preferably provided with a series of drilled passages 55, each of which communicates with at least two of the annular grooves 54, the outer ends of said passages being closed as by plugs 55₁. It will be seen therefore that when a certain cylinder is under high pressure, fluid therefrom will be forced through the opening 50, the bore 51 in its connecting rod, the bore 52, passage 53, a portion of groove 54, one of the drilled passages 55, through a part of the annular groove 54 of an adjoining cylinder, through another drilled passage 55, etc., so that the fluid from said cylinder is delivered to the annular passage made up of the annular grooves 54 and drilled passages 55 and thus back through the passage 53 of a cylinder under lower or minus pressure through the passage 52, thus lubricating the flange end of the connecting rod and passing through the axial bore 51 to and lubricating the ball joint 35 within the piston. Due to the action of check valve 52 the fluid is prevented from flowing into the cylinder under low pressure. In this way it will be seen that a piston under low pressure has its operating parts lubricated by fluid from a cylinder which at the moment is under higher pressure and that the clearances between the various working surfaces are entirely filled up with oil under pressure so that when an instant later in the cycle compressive forces come into play the surfaces cannot come together until after the oil has been squeezed out from between them. This is a matter of the delivery of a highly viscous fluid through extremely small openings which necessarily requires an appreciable time interval. In view of the speed at which these devices operate the time interval is so short that the film is never forced out. Another and a most important result is that the presence of the oil film eliminates all shock which has been experienced in devices as constructed heretofore due to sudden reversal of stresses.

It was discovered by the applicant that the pressure of the oil as delivered through passage 52 into the connecting-rod bearings was too high when the pump is used at high pressure. This resulted in an excessive loss of oil at these points and excessive pressing of the ball 37 against the ring 40. In order to reduce the pressure below the pressure delivered by the pump the invention comprises a suitable throttling means. In the form shown in Fig. 9 this may comprise a throttling pin 56 more or less loosely positioned within the bore 53. This serves to greatly restrict the area of the passage and to reduce the pressure, it being understood of course that the oil flowing toward a particular connecting rod must flow by two of these throttling pins, one pertaining to the cylinder at the moment under pressure, and the other one to the cylinder under lower or minus pressure. The desired result could also be obtained by simply reducing the bore of the passage 53 to the required dimensions but the form shown and described is preferably because there is less danger of clogging. It will be noted that the throttling pin 56 is capable of a slight longitudinal movement and as the flow of oil therethrough is reversed twice in each revolution, the pin is shifted back and forth and thus particles of foreign matter do not become lodged within the restricted passage.

Fig. 11 shows a slightly modified form. The throttling pin 56₁ is shown as of about the same diameter as the bore but with one side thereof flattened, as shown in Fig. 12. It will also be noted that the inner end 56₂ of the pin is cylindrical and forms a piston in an extension of the bore 53 beyond the center so that a dashpot is formed which limits the velocity of movement of the throttling pin. In this construction the throttling pin is formed with a reduced portion 56₁ₐ opposite the bore 52 which may therefore be of smaller diameter. It will be noted that in the form shown in Fig. 9 the bore 52 is of a diameter larger than that of the bore 53 so as to assure that the passage will always remain open.

Fig. 13 shows a throttling pin 56₂ having its effective portion of square cross-section, thus providing a throttling area on four sides of the pin.

Fig. 14 shows a similar construction wherein the throttling pin 56₃ is provided with a cut 56₄ of suitable cross-section.

Fig. 15 shows in cross-section the cylindrical pin 56 of Fig. 9.

The construction described above will assure that a limited quantity of oil is delivered at each revolution to each of the interconnecting rods at a time when they are not under load but it is assured that a certain quantity will always be delivered because the throttling effect only comes into play when the velocity of flow through the restricted sections acquires a certain value and, therefore, results in corresponding pressure drops according to the well-known laws of fluid friction.

Although the above described throttling means results in a substantial reduction in the oil pressure acting upon the terminal hemispheres of the balls, it has been found that this pressure tends to press the balls outwardly against the rings 40 with sufficient pressure to create substantial friction and wear on the inner hemisphere of balls 37. To reduce this friction and wear means are preferably provided to assure adequate lubrication of the areas of contact between the ball 37 and the ring 40. This is preferably accomplished by forming the cup 38 and/or ring 40 with an external annular groove 60 and an internal annular groove 61, which grooves communicate with each other at one or more points by passages such as 62 (see Figs. 9 and 10).

Figure 6:
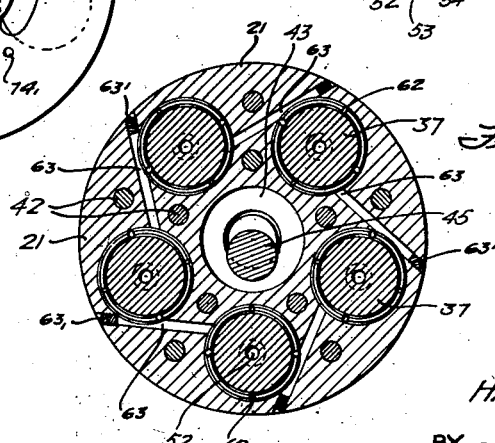
Fig. 6 is a cross-sectional view on the line 6—6 of Fig. 1 showing the arrangement of passages for lubricating the outer portions of the connecting rod ball joints.

By referring to Fig. 6 it will be noted that the operating flange is provided with a series of drilled passages 63, the ends of which are closed as by plugs 63₁, which passages communicate with the outer annular groove 60 (see Fig. 9), and through passages 62 with the inner annular groove 61. In other words, said passages 60, 62, and 63 provide an annular passage connecting with the spherical sockets. It will also be noted that whenever a certain connecting rod is under compression and it is therefore seated firmly against the cup member 38 and clearance is developed between the ball and the ring 40, that oil may fill this clearance space, which oil is delivered from one of the sockets which at that moment is not under compression, it being understood that the latter is under the pressure of oil coming in through passage 52, which pressure is sufficient to move that ball against its ring 40 and thereby permitting a small amount of oil to flow from 52 around the terminal hemisphere of the ball into groove 61, through passages 62, into groove 60, and thence through the appropriate drilled passages 63. In this way oil under pressure is forced between the balls 37 and the ring 40 related to a certain cylinder while the related connecting rod is under compression. With this construction it will be readily apparent that adequate lubrication of the coacting surfaces of ring 40 and ball 37 is provided for and that since the clearance space is completely filled with oil under pressure the sudden application of tension to a connecting rod does not result in shock and impact as would otherwise be the case.

The improved construction of the bearing between the cylinder block and the stator face will now be described. It is desirable in pumps and motors of this type to have the cylinder block 32 press against the stator face with a substantial pressure so as to reduce the leakage of oil, particularly from the high pressure port 46 or 47, to the outside. As the cylinder block rotates at high speed relative to the stator, the construction of the coacting surfaces is highly important. In my prior Patent 1,924,629, granted August 29, 1933, is disclosed and claimed a construction for this purpose and the construction about to be described is an improvement upon the construction of my said prior patent. Referring to Fig. 3, sectors A to F show various modified forms, it being understood that in actual construction there may be a plurality of sectors which may all be of the type shown in any of the sectors A–F inclusive, or any combination thereof. Furthermore, in devices which are constructed to operate only in one direction and where one of the segmental ports 46 or 47 will always be the pressure port, only a portion of the circumference will be constructed in accordance with one of the forms of embodiment disclosed.

Referring to sector A, it will be understood that 70 is a depression in the face of the stator of suitable area and adapted to receive oil under pressure from the pressure port 47. In order to get an automatic control of the pressure in depression 70, in accordance with the pressure in port 47 and to provide an automatic adjustment of the clearance between the cylinder block 32 and the stator face for reasons pointed out in greater detail in my Patent 1,924,629, a throttling passage 71 of very small cross-sectional area is provided from port 47 to depression 70. As shown in sector A this is preferably arranged circumferentially for reasons to be presently mentioned and is connected with port 47, with a channel 72 and with depression 70 by channel 73. It has been found that due to the small cross-sectional area of the throttling groove 71 there is a likelihood that it will become clogged with foreign matter. To avoid this, the groove 71 is preferably arranged circumferentially and the cylinder block is provided with a depression, such as 74 (see Fig. 4) which is caused to sweep lengthwise over the throttling groove 71 at each revolution and thereby flush out any foreign matter which may be present. If the particles are too large to be flushed out they will be ground to smaller size by the co-action of the edges of hole 74 with the grooves 72 and 73.

Sector B is identical with sector A except that the depression 70 is made smaller in area by providing an "island" 75 therein, which island may be slightly beveled at either or both ends to give a viscosity pump effect and thus build up an oil film which will assist in supporting the thrust, the operation and purpose of which will be clear by reference to my prior Patent 1,924,629.

Sector C differs from sector A only in that the throttling groove 71₁ is arranged obliquely. With this form of construction the hole 74 in the cylinder block may not cooperate with the full length of the groove 71, and therefore it may be desirable to provide additional holes 74₁ and 74₂ spirally arranged with respect to hole 74. Or, in the alternative, a single hole 74₃ of larger radial dimension may be utilized.

Sector D differs from sector A in that the throttling groove 71₂ is arranged radially. It will be flushed by means of the spirally arranged holes 74, 74₁, 74₂, or some equivalent construction, such as the groove 74₄.

In order to avoid the flow of oil directly from the pressure port 47 to the depression 70 a draining groove 76 and 77 have been shown. This assures that the oil pressure in depression 70 will be controlled almost entirely by the throttling groove 71₂.

Sector E corresponds to sector B insofar as the depression 70 contains an island 75 and the throttling groove 71₂ corresponds to the groove in sector D.

Sector F shows another embodiment of the invention wherein the throttling groove 71₃ connects with a generally circumferentially arranged groove 71₄ which may have a plurality of generally radially arranged grooves 71₅. All of these may be of small cross-sectional area and therefore be regarded as throttling conduits but it will usually be advisable to form at least the grooves 71₅ and sometimes the groove 71₄ as of substantial dimensions, the throttling being effected by grooves 71₃. It will be noted that the grooves 71₄ and 71₅ serve to distribute the oil to a substantial area, from which area the oil is allowed to exude from the joint between the cylinder block and stator face at its outer edge.

All of the constructions just described provide oil supply throttling passages to distribution areas in such a way that the distance between the faces is automatically adjusted to assure adequate lubrication and a minimum loss of lubricating oil, and the holes 74 and/or 74₁, 74₂, 74₃, 74₄, serve to flush out any foreign matter which might otherwise tend to accumulate in these fine passages.

It will be noted that in pumps and motors of this type, particularly the larger size units when operating at high speeds, the pistons will be pressed against the cylinder walls by the action of centrifugal force. These forces may be many times the weight of the piston and may result in substantial friction and therefore loss in efficiency, as well as wearing of the cylinder and piston surfaces, resulting in leakage. The present invention includes means for compensating for the centrifugal forces by causing the oil under pressure in the cylinder to develop a greater total pressure toward the center of oscillation than away from the center. As the piston is preferably free to rotate in the cylinder this is best accomplished by means formed upon the piston and arranged around its circumference. Referring to Fig. 8, the desired result may be obtained by means of fine throttling grooves 80 arranged generally longitudinally and preferably provided with a series of circumferential branch grooves 81, a plurality of these being arranged around the circumference, four in the instance shown. The arrow 82 (Fig. 8) represents an external force acting upon the piston which may either be the weight of the piston, centrifugal force, or the like. The dotted arrows 83 indicate the full pressure acting upon the head of the piston. The dotted arrows 84 indicate the pressure acting upon the upper side of the piston, the numeral 85 indicating the pressure gradient. The dotted arrows 86 represent the pressure acting upon the bottom surface of the piston and 87 represents the pressure gradient. Due to the action of the force 82, the piston is moved slightly downward relative to the cylinder so that a passage is made available for the flow of oil at this point, the area of which is large in relation to the cross-sectional area of the throttling groove 80, so that the pressure gradient 85 is substantially a straight line. On the lower side of the piston, however, the passage is very small, merely the thickness of an oil film so that its area is small in relation to that of the throttling groove 80. Since the escape of oil at this side from the outermost groove 81 to the outer end of the piston is very much restricted, due to the small clearance, the grooves 80 and 81 are, in spite of their small cross-sectional area, able to supply sufficient oil and since the quantity flowing away is small the velocity of flow in the groove 80 is so low as to create substantially no reduction in pressure due to fluid friction. Therefore, the pressure gradient 87 will be substantially parallel to the axis of the piston, as shown, its altitude being the same as that of the pressure indicated at 83. However, from the outermost groove 81 to the end of the piston the gradient 87 drops rather rapidly to zero. It will be noted that the area under the gradient 87 is substantially greater than the area under the gradient 85, the difference being just sufficient to compensate for the force represented by the arrow 78

82. This adjustment is entirely automatic because if the pressure under gradient 87 gets too high the piston will be moved further away from the lower side and therefore permit greater escape of oil and thereby reduce the form of pressure gradient 87 to something like that shown in the dotted line 87₁, and vice versa.

While this form of piston construction is highly desirable in pumps and motors of this type it is to be understood that it is applicable generally in other relations. For example, it may be used in large pumps having horizontally moving pistons to compensate for the weight of the piston or it may be used in monometers and other pressure responsive devices wherein it frequently occurs that the pressure wedges the piston against one side of the cylinder, creating substantial friction resulting in loss of sensitiveness, wear, leakage, etc., all of which is eliminated by the construction shown and described.

In pumps and motors of this type it is, of course, essential to provide a thrust bearing to support the thrust of the connecting rods against the operating flange 21 and shaft 20. While ball thrust bearings are suitable in smaller machines operating at relatively low speeds, the action of centrifugal force upon the balls at high speeds creates additional friction and wear which shortens the life of such machines. To overcome these difficulties the invention includes an oil pressure compensated thrust bearing. Referring to Fig. 1, the shaft 20 has rigidly attached thereto a collar 90 which, under the thrust of the pistons, is caused to bear against a non-rotary collar 91, one face 92 of which is preferably plane and cooperates with the plane face 93 on collar 90. The other face of collar 91 is preferably formed with a spherical face 94 cooperating with a spherical seat 95 in the stationary member 22. It is desirable to make these coacting surfaces of spherical form because due to errors in manufacture and due to deflections in the shaft, the radial bearings, etc., it would otherwise be difficult to assure a proper seating of the collar 90 against the collar 91. The spherical abutment if properly lubricated as described hereinafter will permit a limited adjustment of the stationary collar 91 relative to the body member 22. To prevent rotation of the collar 91 it is preferably provided with a pin 96 loosely fitting in a recess 97 in the member 22 so that slight rocking is permitted but rotation prevented. In the form shown in Fig. 1 and Fig. 7, one of the collars, 91 in the form shown, is provided with suitable fluid pressure balancing devices such as the depression 100, which depression is filled with fluid such as oil under pressure. This may be supplied by means of a conduit 101 (Figs. 1, 1A, and 7) connecting with an annular passage 102 provided in the edge of the collar 91 and closed by means of the band 103. Oil under pressure is supplied to conduit 101 as by a separate oil pump or by connecting it with the pressure side of the pump. Connecting with said annular passage 102 are preferably a series of radial drilled passages 104 connecting with passages 105, as shown in sectors A, B, and C, of Fig. 7. In the form shown in sector A of Fig. 7, a throttling groove 106 leads from the passage 105 to the depression 100, serving to maintain an appropriate oil pressure within said depression and between the surfaces so as to assure adequate lubrication and operation of the surfaces and so hydraulically balance the thrust and with a minimum loss of fluid. The effect of the throttling groove is the same as in connection with the cylinder block and stator described hereinabove in connection with Fig. 3. Draining grooves 107 and 108, as shown in sector A of Fig. 7, may also be provided. Sector B shows a similar construction except that no throttling groove is present but passage 105 emerges through an island 109 located within the depression 100. The very limited area between the top of the island and the face 93 of the collar 90 restricts the flow of fluid and thereby creates the same effect as the throttling groove 106. Sector C shows an arrangement similar to sector B except that a throttling groove 110a is formed in the island 109 to facilitate distribution of the fluid. Sector D shows a depression 100₁ formed with islands 109₂ and 109₃ therein which islands are preferably formed at one or both ends with a slightly inclined section 111 to produce a viscosity pump effect, causing oil to be drawn between the islands and the cooperating face 93 of the collar 90. It is, of course, understood that all or only the required portions of collar 91 may be provided with suitable oil pressure compensating devices such as shown in one of the sectors A, B, C, or D of Fig. 7, or that various forms thereof may be used in combination.

The band 103 referred to above is preferably shrunk in place in order to assure a tight fit. Fig. 1A shows a slightly modified form in which the annular depression 102₁ is made somewhat deeper and is closed up by means of a ring 103₁ of copper, lead, or the like, which is peened in place. In this case the tube 101 would be connected directly to the collar 91 and connected to the annular channel 102₁ by means of a drilled passage 102₂.

By reference to Fig. 1 it will be noted that the collar 90 is preferably formed with a drilled hole 106₁ which sweeps over the various throttling grooves 106 and/or 110 (Fig. 7) and serves to remove therefrom any foreign matter which might otherwise collect therein.

Figure 16:
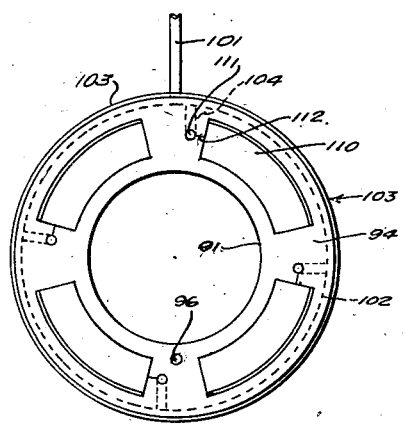
Fig. 16 shows the spherical face of the thrust bearing stator ring of Fig. 1.

In order to assure adjustment of the collar 91 relative to its spherical seat, it is desirable to provide proper lubricating and pressure compensating means. To this end, as is shown in Figs. 1 and 16, the convex face 94 of the collar 91 may be formed with a series of depressions 110 (see Fig. 16), which also receive oil from the annular passage 102 as through drilled passages 111 preferably connected to radial passages 104. The passage 111 is connected with the depression 110 by a suitable groove 112 which may, if desired, be a throttling groove, although this is not always essential.

A somewhat modied form of thrust bearing is shown in Fig. 2 wherein the oil for lubrication and pressure compensation is derived not through an external conduit but from the ball joint lubricating system. In this case, the shaft 20 is formed with an annular passage 120 against which is firmly seated the collar 90₁, against which bears the collar 91₁ generally of the same form as collar 91. Oil under pressure is led to said annular passage 120 by means of a generally longitudinal bore 121 connecting with one of the drilled passages 55, as shown in Fig. 2, the oil being distributed to the depressions 100a in the same manner as described above in connection with Fig. 1. Similarly, oil pressure may be delivered to depressions 110 in the convex face of collar 91₁ as by means of passages 122 which may connect with the depressions 100a in the rotating collar 90₁.

Figure 17:
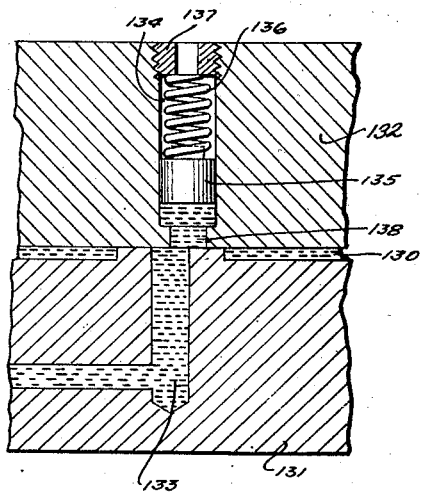
Fig. 17 shows a modified form of means for transmitting lubricating oil to the bearing depressions shown in Figs. 3, 7 and 16.

Fig. 17 shows another modified form of device for transferring lubricating liquid to one of the pressure compensating depressions such as 70, 100, and 110, described above. The depression in this case being indicated by the numeral 130. The numeral 131 designates, for example, the stationary member whereas 132 designates the movable member. Oil under pressure is supplied to passage 133. The member 132 may be provided with a cylinder bore 134 within which operates a piston 135 biased downwardly by means of spring 136 abutting for example against a plug or ring 137. It will be noted that as the port 138 connected with the cylinder comes into registration with the pressure passage 133, the piston will be driven upwardly against spring 136 whereby a quantity of oil under pressure is received within the cylinder, which oil is carried over into the depression 130, the pressure in which is adjusted to a value predetermined by the pressure in passage 133, strength of spring 136 and the area of the piston 135.

Figure 18:
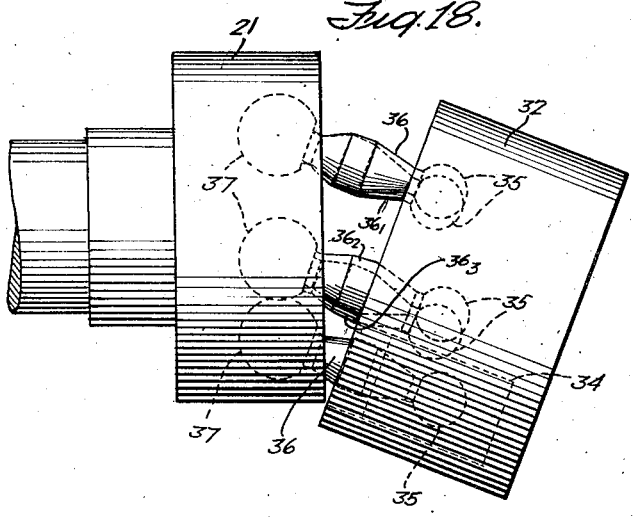
Fig. 18 is a view similar to Fig. 1 but taken in elevation and showing a preferred arrangement wherein the driving flange is somewhat displaced in phase from the cylinder block to provide easier starting and more efficient operation.

Fig. 18 illustrates a preferred arrangement of the relationship between the driving flange 21 and the cylinder block 32. Instead of having the spherical socket in the driving flange located in the plane of the axis of the cylinder bore, it has been found desirable in some cases to displace the cylinder block somewhat out of phase. It will be noted that the pistons designated 36 and 36₁ do not overlap as seen in Fig. 18, although their outer ends are located in the same horizontal plane. The same is true of the pistons designated 36₂ and 36₃. This results in a more favorable angle of operation whether the device be used as a pump or as motor.

Fig. 19 shows a modified form of piston construction especially for large size pump operating under high pressure. For these large pumps it has been found desirable to make the cylinder block of steel. As steel will not operate properly on steel the pistons must be made of some other material. For smaller devices it is possible to make the pistons of bronze. However, this is out of the question with larger devices on account of thermal expansion which is much greater for bronze than for steel or cast iron. Cast iron pistons will not operate properly in steel cylinders since the small parts of the cast iron are welded upon the steel. These difficulties have been overcome in accordance with the form of invention illustrated in Fig. 19 in which the piston 34₁ which may be of iron or steel is formed with one or more dove-tail grooves 140 within which are rings 141 of Babbitt metal or the like. These rings are cast or hammered into place. If cast in place it may be desirable to form the piston with a number of holes 142 which permit the escape of air during the casting in process and for anchor pins 143 which provide a firm anchoring of the Babbitt metal ring. This casting in is preferably done before the piston is turned down to final size. When the turning operation is finally performed the iron or steel parts of the piston will be of the same diameter as the Babbitt metal parts, presenting a continuous, smooth cylinder, the surface of which consists alternately of iron or steel and Babbitt metal. If the pressure compensating grooves shown in Fig. 8 are used it is desirable to have the transverse branches 81 thereof formed in the iron or steel parts. If they are placed within the Babbitt metal ring sections there is a possibility that they will be closed up. The longitudinal portions 80 of the groove will extend through one or more of the rings.

The operation which is surprisingly effective is apparently due to the fact that as soon as any of the iron or steel is removed from the piston a small amount of Babbitt metal is deposited thereon. This prevents the welding of the working surfaces and their consequent destruction. The reason for this is based on the theory discovered by applicant that an alloy of tin and iron has very little strength. In any event, steel or iron surfaces lubricated with Babbitt metal never adhere firmly. This construction has the advantage over pistons covered entirely with Babbit metal in that the pistons are not so easily scratched or eroded since hard foreign material, the presence of which can never be entirely avoided, will be comminuted between the iron surfaces. Any resulting particles which are not washed away are pressed into the Babbitt metal and thereby become harmless. After operation, examination with the microscope shows hundreds of particles of foreign material imbedded within the babbitt. Instead of Babbitt metal, copper and particularly soft lead copper can be used which may either be cast in place or hammered in.

Fig. 20 shows a form of construction generally similar to Fig. 1 with the exception of the arrangement for lubricating. In this case the connecting rod ball joints are lubricated from an external source of pressure, such as a separate lubricating pump or from the pressure side of the pump itself, but instead of being communicated directly from the cylinder through the piston, the lubricant is delivered, in the form shown, from the fluid supported thrust bearing.

As in the form of Fig. 1, oil is supplied to the device through any suitable passage as the tube 101 where it is applied by the means shown in Fig. 1, to lubricate the spherical engaging surface between the stationary thrust bearing member 91 and the body member 22. As in the construction shown in Fig. 1, oil from conduit 101 is led into annular passage 102 through a series of radial passages 104, thence through passages 111, throttling grooves 112 (Fig. 16) to the bearing depressions 110. Through the passages 105 oil is led to the depressions 100 in the rotating thrust bearing collar 90 by means of one of the forms of construction shown in Fig. 7. In order to bring some of this oil under pressure to the connecting rod bearings the collar 90 is shown as formed with an axial passage 150 (Figs. 20 and 21) which connect with an annular passage 151 cut in the collar 90 or the shaft 20. Leading from said annular groove is one or more radial passages 152 connecting with a generally axial passage 153 which connects with one of the drilled passages 55 (see Fig. 5) which form part of the annular passage in the driving flange 21, which serves to lubricate the connecting rod ball joints through annular groove 54 in the socket cup member 38 which, through passage 53, connects with the passage 52 which connects with the bore 51 in the connecting rods. It will be noted that the piston 34₂ in this form is not perforated so that this lubricating oil cannot pass through the piston into the cylinder. It will be noted, however, that as the oil in tube 101 is constantly under pressure that the connecting rod ball joints will at all times be subjected to oil under pressure which at those moments when the connecting rods are not under load will penetrate between the bearing surfaces to assure adequate lubrication and elimination of shock and vibration. It will be noted that due to the many restricted passages through which the oil passes it will, in most cases, not be necessary to provide the throttling pin 56 in the passage 53.

In order to provide a suitable passage for the oil from one of the depressions 100 to the passage 150 (Fig. 20), the construction shown in Fig. 21 may be desirable wherein the collar 90 is shown as provided with one or more generally radial grooves 154 partly overlying the depressions 100 and spaced from the passages 150 and connected therewith by a throttling groove 155. The stationary collar 91 may be provided with one or more flushing depressions 156 which, at each rotation, pass over and flush out the throttling grooves 155.

With the arrangement just described it will be noted that lubricating fluid is caused to lubricate and balance the thrust of a thrust bearing and through said bearing to be transferred to the rotating elements of the device from which it is carried to the connecting rods for lubricating the joints thereof.

In the form shown in Figs. 22 and 23 the numerals 46 and 47, as in Fig. 3, represent segmental intake and delivery ports. As shown, a generally annular sealing surface 160 is provided outwardly of said ports and an external sealing flange 161 may also be provided. Located between said members 160 and 161 is a generally annular depression 163 provided with a large number of islands, 162, the tops of which are preferably in the same plane as members 160 and 161. If desired, a similar arrangement may be provided inside of the ports as by the sealing surface, 164, depression 165, and islands 166 formed therein. Under certain circumstances it may be desirable to provide a drain passage 167. If this is not provided the oil within depression 163 will be under more or less pressure. The islands are separated circumferentially by a series of radial grooves 163₁. The operation of the device is as follows:

A certain amount of oil exudes from between surfaces 160 and the end of the cylinder block 32 or other member rotating relative thereto and fills the depression 163. It has been proposed heretofore to furnish bearing surfaces with bevelled leading edges to cause oil to be drawn between the relatively moving surfaces by the effect of viscosity. It has been found that by using a large number of such islands the necessity for bevelling the leading edges is obviated. This is due either to the accumulative effect of the large number of leading edges or to the fact that inaccuracies in manufacture, which are probably entirely unavoidable, provide a degree of bevelling to the leading edges which, even though microscopic, is sufficient for the purpose when a large number of such islands or bearing surfaces are provided.

Fig. 24 shows thrust plate bearing surfaces substituted for the elements 75 of Fig. 3, 109, 109₁, 109₂, of Fig. 7, and/or 162 of Fig. 22 in which said surfaces or "islands" are formed generally cylindrically. This construction has the advantages of simplified manufacture and quick initial lubrication of the effective bearing surfaces. The said effective bearing surface is very small and the oil film is therefore quickly spread thereover.

It will be understood that the construction described above is equally applicable as a pump or as a fluid motor and the term, "hydraulic displacement device," will be used in the claims to indicate a pump, fluid motor, or other hydraulic device where a piston operates in a cylinder or where members have motions relatively to each other in such a way as to involve a hydraulic displacement.

While I have herein shown and described only certain embodiments of certain features of my present invention it is to be understood that they are to be regarded merely as illustrative and that I do not intend to limit myself thereto except as may be required by the following claims.

I claim:

1. A hydraulic displacement device adapted to pump or to be operated by a fluid comprising in combination a rotatable shaft serving to operate a disc having a plurality of seats, a cylinder block formed with a like plurality of cylinder bores and having its axis at an angle to said disc, pistons within said cylinder bores, a piston rod for each of said pistons articulated at one end to its piston and at its other end to said disc in the seats thereof and means for conducting lubricating fluid from a cylinder which at the moment is under high pressure to the articulations of the piston rod of a cylinder which at the moment is under lower pressure comprising an annular passage within said disc and to which are connected passages leading through each of said piston rods and said pistons and communicating with said articulations, a thrust bearing for said shaft comprising engaging surfaces, and means for lubricating said surfaces comprising a passage connecting with said annular passage.

2. A hydraulic displacement device adapted to pump or to be operated by a fluid comprising in combination a rotatable shaft serving to operate a disc having a plurality of seats, a cylinder block formed with a like plurality of cylinder bores and having its axis at an angle to said shaft, pistons within said cylinder bores, a piston rod for each of said pistons articulated at one end to its piston and at its other end to said disc in the seats thereof and means for conducting lubricating fluid from a cylinder which at the moment is under high pressure to the articulations of the piston rod of a cylinder which at the moment is under lower pressure comprising an annular passage within said disc and to which are connected passages leading through each of said piston rods and communicating with said articulations, a thrust bearing for said shaft comprising engaging surfaces, and means for lubricating said surfaces by oil under pressure and means for conducting oil from said thrust bearing to said annular passage.

3. A hydraulic displacement device comprising in combination a plurality of cylinders, a piston in each of said cylinders, an operating mechanism for said pistons so constructed and arranged that when one piston is under high pressure another is under lower pressure, a piston rod for each piston articulated to said piston on one end and to the common operating means at the other end, and means for conducting fluid from a cylinder which at the moment is under high pressure to the articulations of the piston rod of a cylinder which at the moment is under lower pressure, said conducting means comprising a passage a part of which lies within said common operating means, and a second passage within said common operating means serving to conduct fluid to those portions of the articulations of the piston rods which are in contact during the suction stroke.

4. A hydraulic displacement device adapted to pump or to be operated by a fluid comprising in combination a rotatable shaft serving to operate a disc having a plurality of seats, a cylinder block formed with a like plurality of cylinder bores and having its axis at an angle to said shaft, pistons within said cylinder bores, a piston rod for each of said pistons articulated at one end to its piston and at its other end to said disc in the seats thereof and means for conducting lubricating fluid from a cylinder which at the moment is under high pressure to the articulations of the piston rod of a cylinder which at the moment is under lower pressure comprising an annular passage within said disc and to which are connected passages leading through each of said piston rods and said pistons, and a second annular passage formed within said disc and passages leading therefrom to conduct lubricating fluid to those portions of the piston rod articulations which are under pressure during the suction stroke.

5. A hydraulic displacement device comprising in combination a plurality of cylinders, a piston in each of said cylinders, common means for operating said pistons relative to said cylinders in such a way that when one cylinder is under high pressure another is under lower pressure, said means comprising piston rods articulated at one end to their respective pistons and at the other end to said common operating means, and means for conducting said fluid from a cylinder which at the moment is under high pressure to lubricate the articulations of the piston rods for the piston of another cylinder which is under lower pressure, said conducting means comprising a passage a part of which lies in one of said pistons and to piston rod, said passage comprising a plurality of intersecting drilled passages within said common operating means, the outer ends of which drilled passages are closed by plugs.

6. A hydraulic displacement device adapted to pump or to be operated by a fluid comprising in combination a rotatable shaft serving to operate a disc having a plurality of seats, a cylinder block formed with a like plurality of cylinder bores, and having its axis at an angle to said shaft, pistons within said cylinder bores, a piston rod for each of said pistons articulated at one end to its piston and at its other end to said disc in the seats thereof and means for conducting lubricating fluid from a cylinder which at the moment is under high pressure to the articulations of the piston rod of a cylinder which at the moment is under lower pressure comprising an annular passage within said disc and to which are connected passages leading through each of said piston rods said annular passage comprising a plurality of intersecting drilled passages the outer ends of which are closed by plugs.

7. In a device of the character described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling conduits extending from said pressure port to each of said depressions whereby fluid under pressure is maintained in said depressions, and means on said cylinder block for removing foreign matter from said throttling conduits.

8. In a device of the character described, a stator, a rotating member bearing against said stator, said stator being formed with a depression therein facing toward said rotating member, a source of fluid under pressure and a conduit leading from said fluid source to said depression, said conduit being of relatively restricted area so as to throttle the flow of liquid therethrough, and means on said rotating member for removing foreign matter from said throttling conduits.

9. In a device of the character described, a stator member, a rotating member bearing against said stator member, one of said members being formed with a depression therein facing toward said other member, a source of fluid under pressure, and a throttling conduit leading from said fluid source to said depression, and means on said rotating member for removing foreign matter from said throttling conduits.

10. In a device of the character described, a stator member, a rotating member bearing against said stator member, a source of fluid under pressure, one of said members being formed with a throttling conduit leading from said fluid source and serving to deliver fluid between said members, and means on said rotating member for removing foreign matter from said throttling conduit.

11. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling grooves extending from said pressure port to each of said depressions whereby fluid under pressure is maintained in said depressions, and means on said cylinder block for removing foreign matter from said throttling grooves.

12. In a device of the character described, a stator member, a rotating member bearing against said stator member, a source of fluid under pressure, one of said members being formed with a throttling groove leading from said fluid source and serving to deliver fluid between said members, and means on said rotating member for removing foreign matter from said throttling groove.

13. In a device of the kind described, a stator provided with a plane face and having inlet and outlet ports opening through said face, one of said ports being for fluid under pressure, a cylinder block having a plane face abutting and coacting with the stator face, said cylinder block having a plurality of cylinders formed therein which open by ports through said plane face, and pistons in said cylinders, said stator being formed with depressions in its plane face in spaced relation to said pressure port and throttling grooves extending from said pressure port to each of said depressions whereby fluid under pressure is maintained in said depressions, and means on said cylinder block for removing foreign matter from said throttling grooves said means comprising a recess in said cylinder block in line with said throttling grooves.

14. In a device of the character described, a stator member, a rotating member bearing against said stator member, a source of fluid under pressure, one of said members being formed with a throttling groove leading from said fluid source and serving to deliver fluid between said members, and means on said rotating member for removing foreign matter from said throttling groove, said means comprising a recess in said other member in line with said throttling groove.

15. A hydraulic displacement device comprising in combination a plurality of cylinders, a piston in each of said cylinders, an operating mechanism for said pistons so constructed and arranged that when one piston is under high pressure another is under lower pressure, a piston rod for each piston articulated to said piston on one end and to the common operating means at the other end, and means for conducting fluid from a cylinder which at the moment is under high pressure to the articulations of the piston rod of a cylinder which at the moment is under lower pressure, said conducting means comprising a passage a part of which is formed with a restricted throttling section.

16. A hydraulic displacement device comprising in combination a plurality of cylinders, a piston in each of said cylinders, common means for operating said pistons relative to said cylinders in such a way that when one cylinder is under high pressure another is under lower pressure, and means for conducting said fluid from a cylinder which at the moment is under high pressure to lubricate the operating means for the piston of another cylinder which is under lower pressure, said conducting means comprising a passage a part of which lies in one of said pistons, said passage comprising a plurality of intersecting drilled passages, the outer ends of which are closed by plugs, and a longitudinally movable throttling pin located in one of said passages.

17. A hydraulic displacement device comprising in combination a plurality of cylinders, a piston in each of said cylinders, an operating mechanism for said pistons so constructed and arranged that when one piston is under high pressure another is under lower pressure, a piston rod for each piston articulated to said piston on one end and to the common operating means at the other end, and means for conducting fluid from a cylinder which at the moment is under high pressure to the articulations of the piston rod of a cylinder which at the moment is under lower pressure, said conducting means comprising a passage a part of which is formed with a restricted throttling section comprising a longitudinally movable throttling pin located in said passage.

18. A hydraulic displacement device comprising in combination a plurality of cylinders, a piston in each of said cylinders, an operating mechanism for said pistons so constructed and arranged that when one piston is under high pressure another is under lower pressure, a piston rod for each piston articulated to said piston on one end and to the common operating means at the other end, and means for conducting lubricating fluid to the articulations of said piston rods comprising a fluid passage having a restricted section and means for alternating the flow of fluid in said passage whereby the accumulation of foreign matter in said restricted section is prevented.

19. A hydraulic displacement device adapted to pump or to be operated by a fluid comprising in combination a rotatable shaft serving to operate a disc having a plurality of seats, a cylinder block formed with a like plurality of cylinder bores and having its axis at an angle to said disc, pistons within said cylinder bores, a piston rod for each of said pistons articulated at one end to its piston and at its other end to said disc in the seats thereof and means for conducting lubricating fluid from a cylinder which at the moment is under high pressure to the articulations of the piston rod of a cylinder which at the moment is under lower pressure comprising an annular passage within said disc and to which are connected passages leading through each of said piston rods and communicating with said articulations, a thrust bearing for said shaft comprising engaging surfaces, and means for lubricating said surfaces comprising a passage connecting with said annular passage.

HANS THOMA.